Nov. 19, 1963
R. H. HEDEL
3,110,955
APPARATUS FOR LOADING ELECTRON TUBE
ELEMENTS INTO A BRAZING JIG
Filed Aug. 25, 1961
4 Sheets-Sheet 4
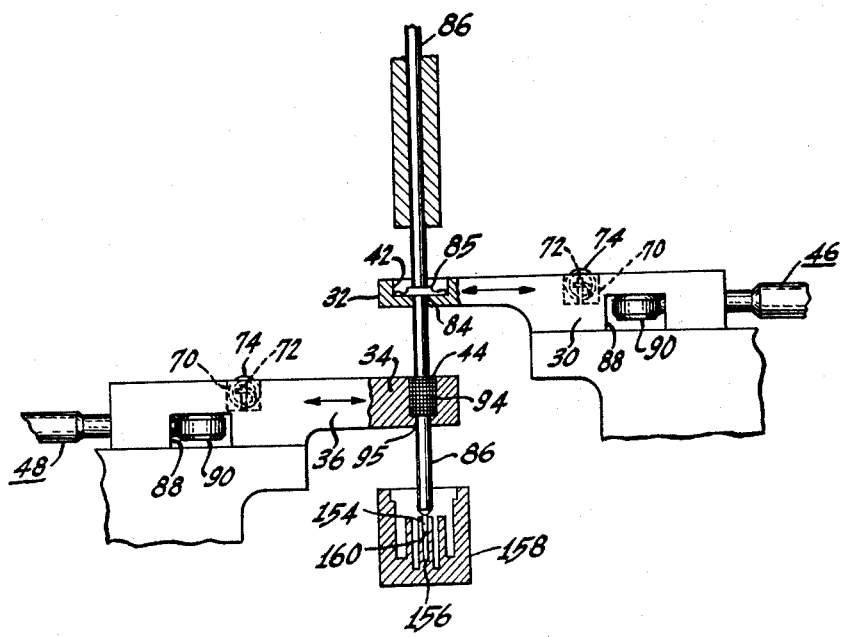
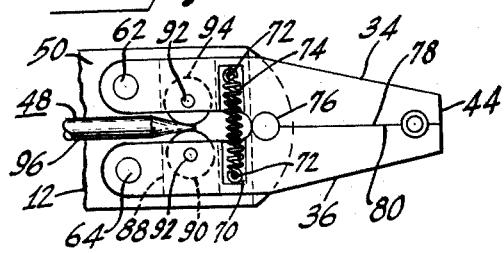
INVENTOR.
RUDOLPH H. HEDEL
BY
William A. Zalesak
ATTORNEY United States Patent Office 3,110,955
Patented Nov. 19, 1963

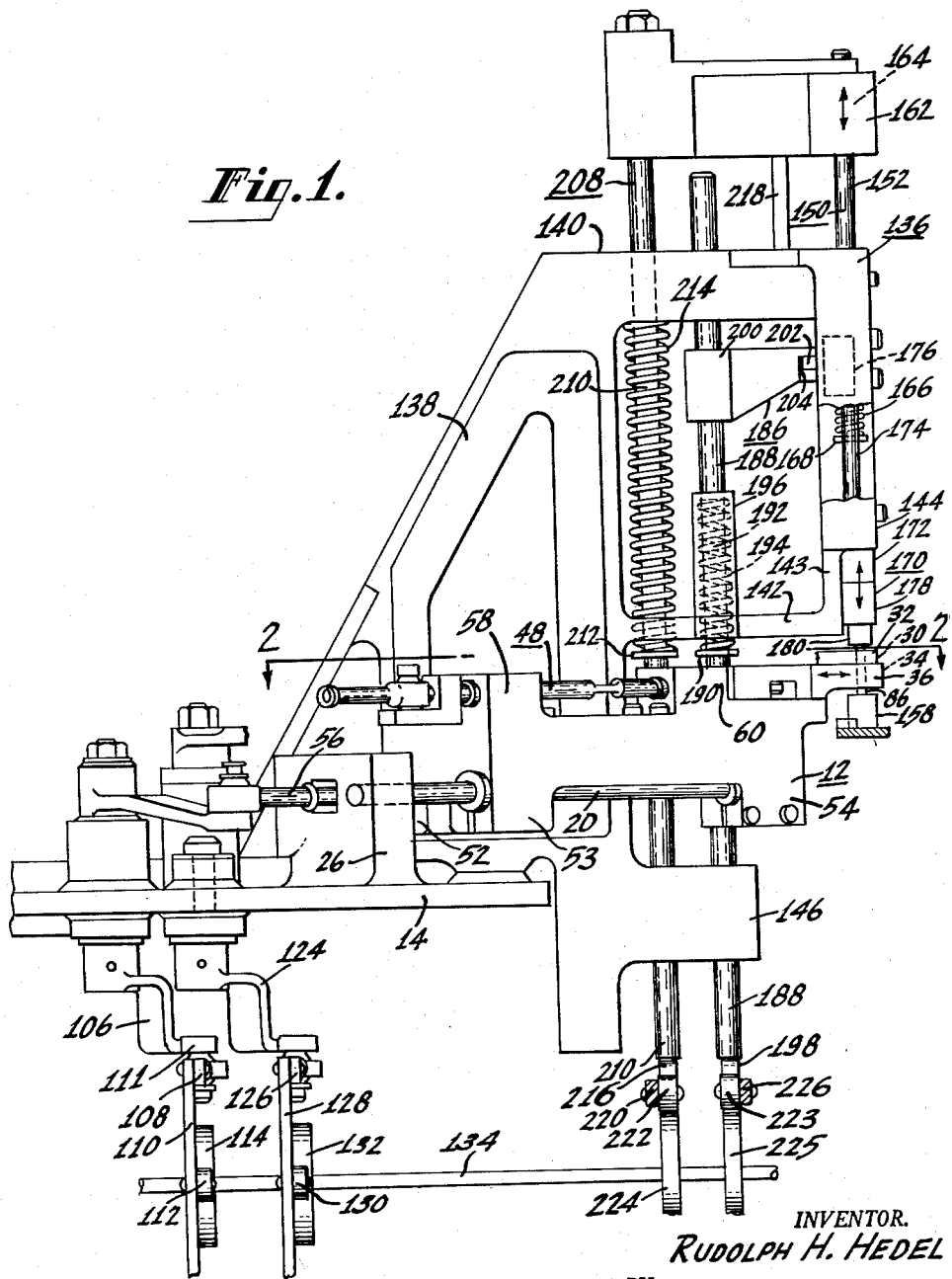

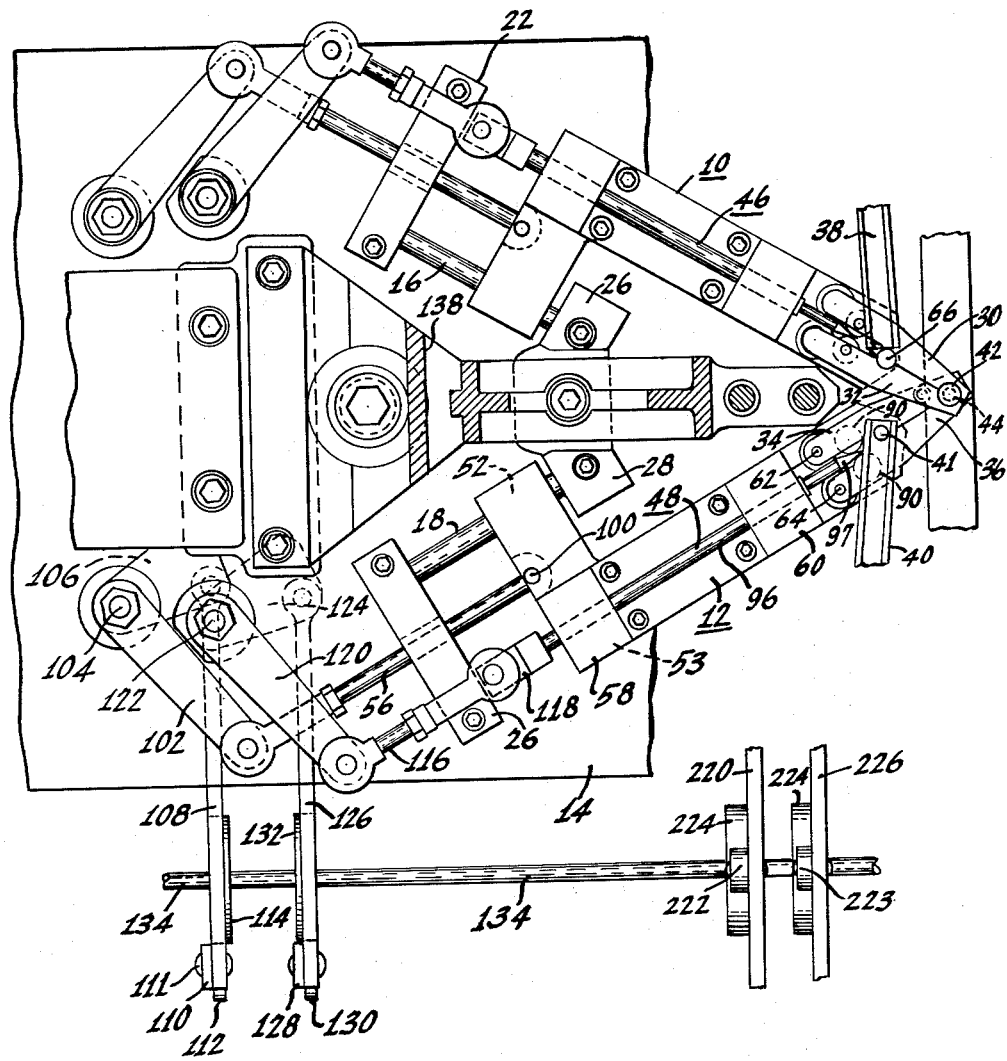

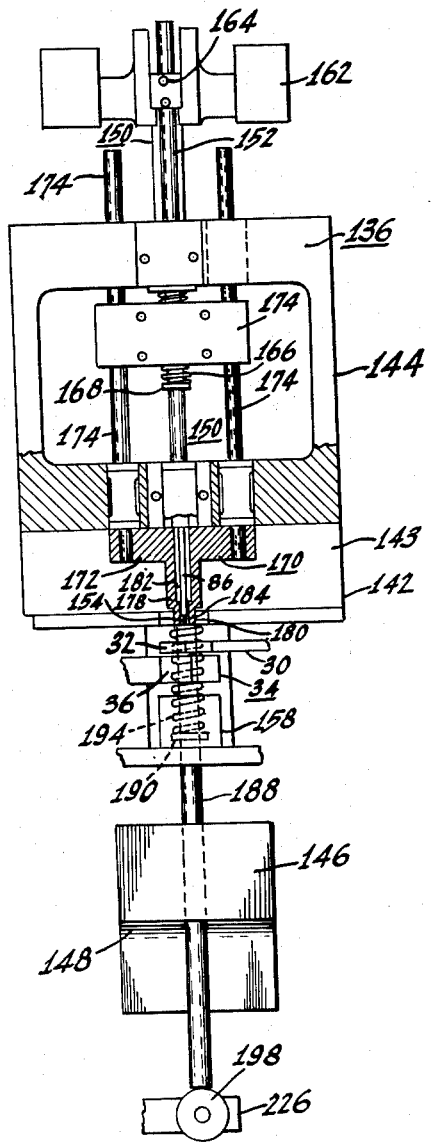

3,110,955
APPARATUS FOR LOADING ELECTRON TUBE ELEMENTS INTO A BRAZING JIG
Rudolph Herbert Hedel, Matawan, N.J., assignor to Radio Corporation of America, a corporation of Delaware
Filed Aug. 25, 1961, Ser. No. 133,960
16 Claims. (Cl. 29—203)

This invention relates to apparatus for loading electron tube elements into brazing jigs. More specifically, this invention relates to automatic apparatus for loading an electron tube element and its supporting flange into a brazing jig.

In a certain type of vacuum tube, the electrodes are concentrically arranged and are mounted on flanges. The flanges are mounted on conductors which extend in a vacuum type manner through an end wafer or header. The electrodes comprising the anode, the grid or grids and the cathode support sleeve, are tubular in shape and may be from about ⅛ to ¼ of an inch in length and from less than ¹⁄₁₆ to about ¼ inch in diameter. The electrode flanges may comprise annular members having central tubular portions shaped to fit the ends of their respective electrodes. The outside diameter of the flanges may vary from about ⅛ to about ⅜ of an inch. In the process of assembling such tubes, an electrode is inserted into a brazing jig and the corresponding flange is placed over it in contacting relation thereto. Then, successively, other elements and their flanges are inserted into the jig, and finally the end wafer and pins are put into the jig. In a later brazing step, each electrode and its flange are brazed together and to their respective conductors or pins and in effect become a unitary assembly.

The brazing jig comprises a cylinder having one end open and one end closed and having concentric cylinders projecting inwardly from the closed end thereof. The relative positions of the tube elements are maintained during brazing by inserting them into the brazing jig into contacting relationship with the concentric cylinders. Due to the small size of the tube elements and to the close tolerances required in their relative positions, manual insertion of such tube elements into the jigs requires careful handling and is a tedious job requiring skilled operators. The shrinkage in manual loading due to the improper loading of the jig is high. While several automatic or semiautomatic devices have been developed for loading tube elements into jigs, room for improvement remains both in the speed and in the accuracy of the prior art jig loading devices, and in the amount of manual attention required to operate these devices.

It is therefore an object of this invention to provide an improved apparatus for loading small electron tube elements into a brazing jig.

It is another object to provide an improved automatic machine for loading a tubular electron tube element and its supporting flange substantially simultaneously into a brazing jig.

Apparatus employing the invention includes two pairs of pivoted slit pocket members, each pair of which may be moved between a pocket loading position and a jig loading position. In the pocket loading position, the pocket members are held in contacting position whereby the pockets are closed and a flange is put into one pocket while the corresponding tube electrode is put into the other pocket. In the jig loading position the pairs of pocket members are positioned one above the other. The pockets, the jig to be loaded, and a quill are aligned in jig loading position. The pocket containing the electrode is between the jig and the pocket containing the flange. During operation and in jig loading position, a quill is moved through the flange and through the electrode and into a locating portion of the jig. Sliding members are provided to separate the members forming the pockets, whereby the split pockets are opened, and a stripper pushes the flange and its electrode along the quill and into their positions in the jig. During stripping of the quill, the open pocket members are moved to their pocket loading position and closed. The closed pockets are then again loaded. The quill and stripper are moved back to their withdrawn position and the cycle is completed.

The invention is described more fully in the accompanying detailed description thereof taken with the drawings in which:

FIG. 1 is a side elevation of apparatus incorporating this invention, with parts broken away to show details of construction;

FIG. 2 is a transverse section of FIG. 1 taken along line 2—2 thereof;

FIG. 3 is a front elevation partly in section of the quill and stripper mechanism of the apparatus utilizing this invention and showing the position of the pocket members and the jig;

FIG. 4 is a fragmentary view showing the pocket members and the quill and brazing jig in the jig loading position; and, FIG. 5 is a fragmentary plan view showing a pair of closed pocket members mounted on a supporting arm and the tip portion of the pocket opener.

A pair of slides 10 and 12 (FIGS. 1 and 2) are mounted on the frame 14. These slides 10 and 12 are positioned at an angle with respect to each other and are structurally related as the right and the left hand, the right hand slide 10 appearing above the left hand slide in FIG. 2. Each slide 10 and 12 slides on a pair of guide rods which are supported on frame 14 by brackets, but only three rods, 16, 18 (FIG. 2) and 20 (FIG. 1) of the four thereof, and only four brackets, 22, 24, 26 and 28 (FIG. 2) of the six thereof appear in the drawing, since the others are hidden by other parts of the drawings. Each slide carries one pair of pocket members near one end thereof. A pair of pocket members 30 and 32 are mounted on slide 10. Another pair of pocket members 34 and 36 are mounted on slide 12. The slide 10 carries the pocket members 30 and 32 between a pocket loading position at the discharge end of a chute 38, and a jig loading position. The slide 12 carries pocket members 34 and 36 between a pocket loading position below the hole 41 in the chute 40 and a jig loading position. At their jig loading position, the pockets are aligned one above the other, the slide 10 moving in a higher plane than the slide 12, whereby the upper pair of pocket members 30 and 32 do not interfere with the lower pair of pocket members 34 and 36.

The pocket members 30, 32 on slide 10 (FIGS. 1, 2 and 4) are similar to the pocket members 34, 36 on the other slide 12 except as noted hereinafter. The pocket 42 formed by the pair of pocket members 30, 32 is made to receive an electron tube flange 85 (see FIG. 4) and the pocket 44 in the other pair of arms 34, 36 is made to receive a tubular electron tube electrode 94. Therefore, the respective pockets 42 and 44 in pocket members 30, 32 and 34, 36 are of different shape. Furthermore, since the axial length of a flange is shorter than the axial length of an electrode, permitting pocket 42 to be shallower than pocket 44, the flange pocket members 30, 32 may be thinner, as shown in FIGS. 1 and 4, than the electrode pocket members 34, 36. Otherwise pocket members 30, 32 and 34, 36 are substantially identical. Since the jig 158 is below the two pair of pocket members, and since the electrode is fitted into the jig with its flange above it, the flange pocket members 30, 32 are the upper pair of pocket members. A pocket opener 46

(FIG. 1) is slidably mounted on slide 10 and pocket opener 48 is slidably mounted on slide 12.

Due to the similarity of the slides and the pocket members, only one thereof is described in detail herein, the arrangement of other slide and pair of pockets being apparent by comparison therewith.

The slide 12 is an L-shaped element (FIG. 2) having dependent bearings 52, 53 and 54 (FIGS. 1 and 2). Bearing 52 slidably fits rod 18 and bearings 53 and 54 slidably fits rod 20. A link 56 is pivotally fixed to the middle of the short leg of L-member 50 for a purpose to be described. The long leg of the L-member 50 has a pair of bearings 58 and 60 fixed to the upper surface thereof, one bearing 58 being near the juncture of the two legs of the L-member and the other bearing 60 being half way along the long leg of the L, for the purpose of slidably guiding the pocket opener 48 as will be described. The pocket members 34 and 36 are pivoted on the slide 12 on a pair of pins 62 and 64. The pair of pins 62 and 64 (FIGS. 2 and 5) extend upwardly from the long leg of the slide 12 at a point to the right of the two bearings 58 and 60, as viewed in FIG. 2. The two pins 62 and 64 are evenly spaced from the center line of the long leg of the slide 12. A locating pin 66 (see FIG. 5) extends upwardly from the end of the long leg of the slide 12, the pin 66 being located near the right hand end of the long leg.

The pocket members 34, 36, forming the split pocket 44, are pivotally mounted on the pins 62 and 64. The pocket members are better shown in FIGS. 4 and 5. The pocket members 34, 36 each have a recess 70 (FIG. 5) partway through each about midway between their ends. Pins 72, 72 extend from the pocket members 34, 36 into the recesses 70, 70 therein and a tension spring 74 is stretched between the pins 72, 72 and urges the pocket members to rotate about the pins 62 and 64 and towards each other to closed position. The pocket members have semicylindrical cut away portions 76 facing each other and positioned to fit around locating pin 66, whereby the spring 74 causes each pocket member 34 and 36 to contact pin 66 at the grooves 76 and the pocket members are oriented with respect to the long leg of the L-shaped arm on which they are mounted. A groove 88 is formed across each pocket member and a roller 90 is mounted on a pin 92 which projects, in a direction parallel to the pins 62 and 64, into each groove 88.

The pocket members are so formed that faces 78 and 80 thereof are brought into contact by the spring 74. The pocket members 34, 36 are cut away at their contacting faces to form the pocket 44, one half of each pocket being formed in each pocket member.

As stated above, the pocket members 30, 32 are similar to the pocket members 34, 36 except that the pocket 42 in pocket members 30, 32 is made to fit a flange while the pocket 44 in pocket members 34, 36 is made to fit an electrode. FIG. 4 may be referred to for the showing of the pockets 42 and 44. It should be understood that the pocket members in their actual arrangement are at an angle of about 60° to each other, being in the position shown in FIG. 2 rather than being aligned with each other as shown in FIG. 4. Furthermore, in FIG. 4, one pocket member of each pair is broken away better to show the pockets therein.

The upper pocket 42 is formed to hold a flange 85. A hole 84 through the pocket 42 is of a size to fit around a lower portion 86 of a quill, as will be explained. Each pocket member 30, 32 has a portion cut out to define one-half of pocket 42.

Similarly, the lower pocket 44 is defined by lower pocket members 34, 36. The pocket 44 receives a tubular electrode, here shown as a grid 94. A hole 95 through the pocket 44 is of a size to fit around the lower portion 86 of the quill, and the hole 95 is too small for the grid 94 to fall through. Further description of the quill will be found below.

The pockets 42 and 44 must be opened to permit the flange and the electrode held therein to be deposited in the jig. The pocket opening means 48 (FIGS. 1 and 2) comprises a push rod 96. The push rod 96 is slidably mounted in the bearings 58 and 60 comprising part of slide 12. The push rod 96 axis extends in a direction between the pocket members 34, 36, and it is axially movable. One end of the push rod 96 is pointed as shown at 97. The pointed end 97 of the push rod 96 normally just enters between the rollers 90, 90, ready to wedge them apart on being moved between them. Upon being moved in the direction of the pocket 44, the conical portion 97 separates the rollers 90, 90 when the pockets are in jig loading position, and opens the pocket 44. The other pocket 42 is opened in a similar manner.

Link means are provided for sliding the slides 10 and 12 between their individual pocket loading position and the jig loading position mentioned above. The means for moving slide 12 comprises the link rod 56 (FIG. 2) pivoted at one end thereof to the short leg portion of the slide 12 at 100. The link rod 56 extends loosely through bracket 26. The other end of link rod 56 is pivoted on lever 102 (FIG. 2) which is rotatably fixed to top end of shaft 104. The shaft 104 extends in a vertical direction through the frame 14. A further lever 106 is fixed to the bottom of the shaft 104 and one end of a further link 108 is pivoted on the further lever 106. The other end of the further link 108 is pivoted at 111 on the cam lever 110. A roller or cam follower 112, mounted on the cam lever 110, contacts a profile cam 114. The roller 112 is kept in contact with the cam 114 by a tension spring (not shown). Therefore, as cam 114 rotates, the slide 12 and therefore the pocket members 34 and 36, move along the rods 18 and 20 in accordance with the shape of the profile of the cam 114.

Means are provided for moving the pocket opener 48 with respect to the slide 12. This means comprises a link 116 pivoted on the end of pocket opener 48 by means of bracket 118. The other end of the link 116 is pivoted at an end of lever 120. The other end of lever 120 is fixed to the top end of shaft 122. The shaft 122 extends in a vertical direction through the frame 14 and the bottom end of the shaft 122 is fixed to one end of a lever 124. The other end of the lever 124 is pivoted to a link rod 126. The other end of the link rod 126 is pivoted to cam lever 128. The cam lever 128 carries a roller or cam follower 130 which contacts cam 132. A tension spring (not shown) keeps the roller 130 against its cam 132. Rotation of cam 132 causes the pocket opener 48 to move longitudinally by means of the linkage hereabove described. The cams 114 and 132 are fixed to the same shaft 134. By proper choice of the contour of the surfaces of the cams 114 and 132, the pocket opener 48 and the slide 12 move at the same rate and in the same direction and with the tip of the conical portion 96 just contacting, but not separating, the rollers 90, 90 until the pocket 44 is to be opened. At that time, the cam 132 moves the pocket opener between the rollers 90, 90 to open the pocket 44. At a later point in the cycle, the pocket opener 48 is moved to the position shown, where the tip 97 only thereof again just contacts, but does not open, the rollers 90, 90 and the spring 74 closes the pocket 44.

Since both slides 10 and 12, both pairs of pocket members 30, 32 and 34, 36 and both pocket openers 46 and 48 are similarly actuated, it is not thought necessary to show completely or to give a detailed description of the means for moving the top or flange slide 10 or for opening and closing the flange pocket 42. The means for actuating the slide 10 and the pocket members 30, 32 will be understood from the above description of the actuation of the arm 12 and pocket members 34, 36.

The pockets 42 and 44 are loaded at their individual pocket loading positions. In the electrode pocket loading position, a tube electrode may be fed by any well known means, not shown, down a chute 40, and through a hold 41 therein, or by hand, into the electrode pocket 44. In the pocket loading position of the flange pocket 42, a flange is fed, in properly oriented manner by any well known feed means (not shown) down chute 38 or by hand to the flange pocket 42. Since the apparatus for feeding electrodes and flanges to their respective pockets is not part of this invention, no further description thereof appears necessary.

A quill and stripper means or assembly 136 is provided for loading an electrode and its flange into a jig. Means are provided to move a portion of the quill down through the flange pocket and further down through the electrode pocket and into the brazing jig while the two pockets are closed. A stripper is provided to strip the elements down and off the quill and into the jig when the pockets are then opened, with the quill portion in the jig, and this positions the elements in the jig.

The quill and stripper assembly 136 (FIGS. 1, 3 and 4) comprises a frame 138 which is generally triangular in shape. The frame 138 is bolted in vertical position to the frame 14, the frame 138 being positioned between the flange slide 10 and the electrode slide 12. A forwardly extending upper bracket 140 (FIG. 1) extends from the top of the triangular frame 138 and an intermediate bracket 142 extends forwardly below the upper bracket 140. The intermediate bracket 142 extends upwardly at an end 143 thereof. Support 144, of hollow rectangular shape (see FIG. 3) is integrally fixed to and between the ends of the upper bracket 140 and the upturned portion 143 of the intermediate bracket 142. A lower bracket 146 extends downwardly and forwardly from the generally triangular frame 138 below the frame 14. The rectangular frame 144 slidingly supports the quill 150.

The quill 150, which is mounted to slide through the rectangular frame 144, comprises an upper cylindrical portion 152 of relatively large diameter compared to the diameter of the intermediate portion 86 mentioned above. The portion 152 and the intermediate portion 86 are coaxial. The intermediate portion 86 is of small enough diameter to enter the holes 84 and 95 (FIG. 4) in the pockets 42 and 44. A lower portion 154 of the quill 150 of still smaller diameter fits the locating portion 156 of a jig 158. The lowest tip portion 160 of the quill 150 is conical in shape to help guide the quill portion 154 into the locating portion 156 of the jig 158 as will be explained. The upper large diameter portion 152 of the quill 150 extends vertically through the midportion of the rectangular frame 144. A clamp 164 is fixed near the top of quill 150 and rests in a niche of a cross piece 162. A compression spring 166 is positioned on quill 150 between washer 168 fixed thereto and the underside of the upper portion of rectangular frame 144. In this manner quill 150 is urged downwardly by spring 166 until clamp 164 rests on cross piece 162.

The stripper is mounted for motion along the quill but independently thereof. The stripper 170 comprises a cross bar 172 (see FIG. 3) into the ends of which a pair of guide rods 174 are fixed. The guide rods 174 extend slidably through the rectangular frame 144. A stripper clamp 176 is fixed to the stripper guide rods 174 and moves, as the stripper guide rods 174 slide, between the upper and lower bar of the rectangular frame 144. The large diameter portion 152 of the quill 150 extends with ample clearance through the stripper clamp 176.

The stripper 170 itself comprises the bar 172 and a depending cylinder 178 fixed to the center of the bar 172. A cylinder 180 is fixed to and coaxially with the cylinder 178 at the bottom end thereof. A hole 182 of a size to afford ample clearance for the large diameter portion 152 of the quill 150 is provided in an axial direction through the bar 172 and into the greater portion of the length of the cylindrical portion 178. A smaller diameter hole 184 of a size to slidably fit the intermediate portion 86 of the quill 150 is provided through the smaller cylinder 180 and in communication with the hole 182. The quill 150 extends into and through the holes in stripper 170.

Means are provided for moving the quill and the stripper in vertical directions, and independently of each other. the means 186 for moving the stripper comprises a stripper actuator rod 188 slidably mounted in a vertical direction through the upper bracket 140 and the lower bracket 146, and extending through an enlarged hole through the intermediate bracket 142. A collar 190 is fixed to the shaft 188. A spring holder 192 is fixed to the intermediate bracket 142 and extends upwardly surrounding the shaft 188. The spring holder 192 comprises merely a piece of strap metal shaped into a deep, U-shaped member. The shaft 188 extends through a hole in the strap portion 196 connecting the legs of the U. A compression spring 194 is provided between the collar 190 and the bottom surface of the strap portion 196 of the spring holder 192. In this manner, a spring 194, long enough to accommodate the length of travel of the shaft 188, may be used. The spring 194 urges the shaft 188 down against the roller 198 as will be further explained below. A bracket 200 is fixed to the shaft 188 and extends towards the bracket 176. A tongue 202 on the bracket 176 is held in a bifurcation 204 on the bracket 200. Therefore, when shaft 188 moves, the stripper 170 is moved by the brackets 200 and 176 and rods 174.

The means 208 for moving the quill 150 is similar to the means for moving the stripper. A quill actuating rod 210 (FIG. 1) is slidably mounted, parallel to and at a position displaced backward from shaft 188, through the upper bracket 140 and through the lower bracket 146 and extends through a large hole through bracket 142. A collar 212 (FIG. 1) is fixed to the shaft 210, and a compression spring 214 is provided between the collar 212 and the lower surface of the upper bracket 140 to urge the shaft 210 downwardly against its roller 216. The cross piece 162 is fixed to the top end of the shaft 210. A guide rod 218, fixed in the cross piece 162 and slidable through the upper bracket 140 may be provided for guiding the cross piece 162, if necessary.

The roller 216 is mounted on the end of a lever 220. A further roller 222, mounted at a point along lever 220, contacts the top of cam 224 and acts as a cam follower. Therefore, as cam 224 rotates, the stripper assembly moves up and down as determined by the shape of the cam 224. The roller 198 is mounted on the end of the lever 226. This lever 226 is similar to lever 220 and has a roller 223 and a cam 225 is provided in contact with the roller 223. In this manner, arm 162 is moved up by rotation of cam 224 and the spring 214 keeps the shaft 210 and therefore the cross piece 162 in the lowest position that its cam 224 will permit. The quill 152 is moved up by cross piece 162 and is moved down, as permitted by cross piece 162, only by spring 166.

The operation of the loading means of this invention is as follows: At the beginning of the cycle, the electrode pocket 44 and the flange pocket 42 have been moved to their back or pocket loading positions, below the hole 41 in the chute 40 and below the end of the chute 38 respectively. The pockets 42 and 44 are closed in this position. The quill 152 and the stripper 170 are in their top position where they clear the path of the two pockets 42 and 44. The flange 85 is loaded into the flange pocket 42 in a properly oriented position by being slid down chute 38 or by hand. A tube electrode, here shown as a grid 94, is loaded into the electrode pocket 44 by sliding down chute 40 and through hole 41 therein, or by hand. After loading the pockets 42 and 44, the several cams provided for that purpose, and including cam 114, move the pocket members 30, 32 and 34, 36 forward to the position where they overlie each other with the pockets 42 and 44 coaxially aligned. That is, the slides are moved laterally of the line of motion or path of the quill. The slides move in non-intersecting paths in intersecting planes, the line of intersections of the planes extending through the pockets and defining the path of the quill. While the pocket members are being moved forward, the pocket openers 46 and 48 are moved forward with their respective pairs of pocket members and at the same rate by the cams provided therefor and including cam 132. The pockets 42 and 44 are therefore not opened while the pockets move forward. When the pocket members arrive at their aligned jig loading position, the cam provided therefor allows spring 214 to move quill actuating shaft 210 and cross piece 162 downwardly, permitting spring 166 to move quill 150 downwardly. The intermediate portion 86 of the quill 150 goes through the hole in the flange 85 and through the hole of the tubular electrode 94 and continues downwardly until the lower portion 160 of the quill has entered the jig 158 which may move on its support. If necessary, the tip portion 160 moves the jig 158 laterally to provide final location of the jig 158 by cooperation of the lower portion 154 with the locating portion 156 of the jig 158. After the quill has extended through the flange 85 and electrode 94 and into the jig 156, the pocket opening cams cause the pocket openers 46 and 48 to extend between rollers 90, 90 to thereby open the pockets 42 and 44. The slide actuating cam and the pocket opening cam cause withdrawal of the open pocket members to their above-mentioned loading positions. In the pocket loading position, the arm actuating cams do not move the slides 10 and 12 but the pocket opening cams continue to cause withdrawal of the pocket openers 46 and 48 permitting the springs 74 to close the pockets 42 and 44. In the meantime the stripper cam (not shown) causes the stripper 170 to go down, stripping the flange and electrode into the jig 158. The stripper 170 is caused to go down to the point where the lower small diameter portion 180 of the stripper 170 enters the jig 156 and positions the electrode and its flange in the jig 156. The quill 150 is moved up by its cam 224 and the stripper follows it up to its beginning or retracted position. The cams cause the slides 10 and 12 to move back to their retracted pocket loading position. The pocket openers moving, on slides 10 and 12 to the position at which the pockets are closed, and the cycle is over.

What is claimed is:

1. A jig loading mechanism comprising a pair of pocket members having surfaces adapted to be brought into contact, said members defining between them, when in contact, a split pocket of a size and shape to hold an electron tube element therein, there being a hole through the wall defining said pocket when said members are in contact, a quill having a portion of a size to pass through said hole, means for moving said quill longitudinally thereof through said pocket and through said hole, and means for separating said surfaces for opening said pocket after said quill has passed through said hole.

2. A jig loading mechanism, comprising a pair fo pocket members having surfaces adapted to be brought into contact, said members defining between them, when in contact, a split pocket of a size and shape to hold an electron tube element therein, there being a hole through the wall defining said pocket when said members are in contact, a quill having a portion of a size to pass through said hole, means for advancing said quill longitudinally thereof through said pocket and through said hole, means for separating said surfaces for opening said pocket after said quill has passed through said hole, and means for moving said pocket members along a line transverse to the line of motion of said quill and to a position remote from said quill while said quill is in said advanced position.

3. A jig loader comprising a support slide, a pair of pocket members pivotally mounted on said support slide, spring means for pivoting said pocket members about their pivots and into contacting position whereby portions of said pocket members are in contact, said members together defining, when thus in contacting position, a pocket, each of said members defining half of said pocket, means for sliding said slide from one of a pocket loading position, and a jig loading position to the other position, a quill mounted adjacent said jig loading position, means for advancing said quill through said pocket when in said jig loading position, means for separating said pocket members for opening said pocket after said quill has advanced through said pocket, and said sliding means being operable to slide said slide towards said pocket loading position while said quill is in said advanced position.

4. A jig loading mechanism, comprising a pair of pocket members having surfaces adapted to be brought into contact, said surfaces defining between them, when in contact, a split pocket of a size and shape to hold an electron tube element therein, there being a hole through the wall defining said pocket, a quill having a portion of a size to extend through said hole, means for moving said quill longitudinally thereof through said pocket and through said hole, means for separating said members for opening said pocket after said quill has moved through said hole, and a stripper mounted for longitudinal motion with respect to said quill.

5. A jig loading means comprising a plurality of pairs of pocket members, spring means for holding said pocket members of each pair in contacting position, portions of said pocket members, when in contact, defining a pocket and a hole therein, a half of said pocket and half of said hole being formed in each of said pocket members, a quill at a jig loading position, means for positioning said pairs of pocket members adjacent said jig locating station with the axis of each of said pockets and holes in alignment with each other and in registry with said jig loading position, said quill having an elongated cylindrical portion, said cylindrical portion being of a size to extend through said holes and into a jig at said jig loading position, means for moving said quill longitudinally through said holes and into a jig at said jig loading position, and means to separate said pocket members.

6. A jig loader comprising a plurality of support slides, a pair of pocket members pivotally mounted on each support slide, spring means for pivoting said pocket members about their pivots and into contacting position, each pair of said pairs of pocket members, when in contact, defining pockets in the contacting portions of each pair with one-half of each of said pockets in each member of a pair, means for moving said slides from individual pocket loading positions to a common jig loading position, the pockets when in the jig loading position being aligned with each other, a quill at said jig loading position and in alignment with said pockets, means for moving said quill through said pockets, and means for separating said pocket members for opening said pockets after said quill has been moved through said pockets.

7. A jig loading means comprising a pair of pocket members, spring means for holding said pocket members in contacting position, whereby portions of said pocket members contact, said pair of pocket members, when in contact, defining a pocket having a hole through the bottom thereof, a half of a pocket and half of a hole being formed in the contacting portions of said pocket members, a quill at a jig loading position having an elongated cylindrical portion, the cylindrical portion being of the size to pass through said hole and being sufficiently long to pass through said hole and into a jig at said jig loading position, means for advancing said quill longitudinally and through said pocket and said hole and into a jig at said jig loading position, means to separate said pocket members to open said pocket after said quill has passed through said hole, and means for moving said pocket members along a line transverse to the line of motion of said quill and to a position remote from said quill while said quill is in said advanced position.

8. A jig loading means comprising a pair of pocket members, spring means for holding said pocket members in contacting position, a pocket and a hole through the bottom of said pocket being formed by said pocket members when in contact, a half of a pocket and half of a hole through said pocket being formed in each said pocket members, means for moving said pocket members between pocket loading positions and a position in registry with a jig at a jig loading position, in registry with said jig and a quill at said jig loading position having an elongated cylindrical portion, the cylindrical portion being sufficiently long to pass through said hole and into a jig at said jig loading position and being of a size to pass through the hole in said pocket, means for moving said quill longitudinally through said pocket and said hole and into said jig, and means to separate said pocket members to open said pocket.

9. A jig loading means comprising a plurality of pairs of pocket members, a spring means for holding said pocket members of each pair in contacting position, a half of a pocket and half of a hole through said pocket being formed in each of said pocket members, when in contact, means for moving each of said pair of pocket members between individual pocket loading positions and a position in registry with a jig loading station, the pockets formed by said pairs of pocket members being aligned with each other when said pairs of pocket members are in said jig loading station, a quill at said jig loading station, said quill being in registry with said jig loading station and having an elongated cylindrical portion, said cylindrical portion being of a size to pass through said holes and into a jig at said jig loading station, means for moving said quill longitudinally and through said holes and into a jig at said jig loading station, and means for separating said pocket members.

10. A jig loading mechanism comprising a plurality of pairs of pocket members, the pocket members of each pair having contacting surfaces, a split pocket being formed in each pair of pocket members, when in contact, one of said split pockets being of a size and shape to hold an electron tube element, the other pocket being of such size and shape as to fit an electron tube elecrode, there being a hole through the wall defining each of said pockets, means for moving said pairs of pocket members laterally with respect to a predetermined path to such points that the holes in such pockets are aligned along said predetermined path, a quill having a portion of a size to extend through said holes, means for moving said quill longitudinally thereof along said path and through said holes, and means to separate said pocket members to open said pockets after said quill has been extended through said holes.

11. A jig loading mechanism comprising a frame, a pair of pocket support slides mounted for sliding on said frame from a pocket loading to a jig loading position, a pair of pocket members pivotally mounted on each slide, spring means for pivoting said pocket members towards each other and into contacting position, whereby portions of said pocket members are in contact, half a pocket and half a hole communicating with said pocket being formed in said pocket members when in contact, means for sliding said pocket support slides to a position where said holes are in vertically aligned position, a quill having an end portion of a size to pass through said holes, means for moving said quill longitudinally of itself through said holes, and means to separate said pocket members and thereby open said pockets after said quill has been moved through said holes.

12. A jig loading mechanism comprising a frame, a pocket support slide slidably mounted on said frame, a plurality of pocket members pivotally mounted on said slide, spring means for moving said pocket members about their pivots and towards each other to contacting position, whereby portions of said pocket members are in contact, each of said pocket members having one-half of a pocket and one-half of a hole formed in the contacting portions thereof, a pocket opener slidably mounted on said slide, one end of said pocket opener extending between said pocket members, means for sliding said slide with respect to said frame, a quill having a portion of a size to extend through said hole, means for moving said quill in a lateral direction with respect to the direction of motion of said pocket support slide and through said hole, and means for sliding said pocket opener with respect to said pocket members, whereby said pocket members are pivoted away from each other by the end of said pocket opener and said pocket is opened.

13. A jig loading mechanism comprising a plurality of pairs of pocket members, the pocket members of each pair having contacting surfaces, there being a split pocket formed by the contacting surfaces of each pair of pocket members, one of said split pockets being of a size and shape to hold an electron tube element, and the other pocket being of such size and shape as to fit an electron tube electrode, there being a hole through each of said pockets, means for moving said pairs of pocket members laterally with respect to a predetermined path to such points that the holes in such pockets are aligned along said predetermined path, a quill having a portion of a size to extend through said holes, means for moving said quill longitudinally thereof along said path and through said holes, and means to open said pockets after said quill has been extended through said holes, the paths of motion of said pairs of pocket members being in spaced planes substantially perpendicular to the path of said quill.

14. A jig loading mechanism comprising a plurality of pairs of pocket members, the pocket members of each pair having contacting surfaces, there being a split pocket formed by the contacting surfaces of each pair of pocket members, one of said split pockets being of a size and shape to hold an electron tube element, and the other pocket being of such size and shape as to fit an electron tube electrode, there being a hole through each of said pockets, means for moving said pairs of pocket members laterally with respect to a predetermined path to such points that the holes in such pockets are aligned along said predetermined path, a quill having a portion of a size to extend through said holes, means for moving said quill longitudinally thereof along said path and through said holes, and means to open said pockets after said quill has been extended through said holes, the plane defined by the path of motion of the split pocket for holding the tube element and the path of the quill being at an angle with the plane defined by the path of motion of the split pocket for holding the tube electrode and the path of the quill.

15. A jig loading mechanism for loading a flange-like element and a tubular element in a jig including a frame, a pair of slidable pocket assemblies movable along non-intersecting paths in intersecting planes towards the line of intersection of said planes, each of said assemblies including oppositely disposed pivot members providing between each pair of members a split pocket, said split pockets supporting said flange-like element and said tubular element, said members being movable from a pocket loading position to a jig loading position, the line of intersection extending through said pockets when in said jig loading position, a quill supported on said frame and in registry with the pockets when in jig loading position, and means for moving said quill through said pockets to engage the flange-like element and said tubular element and into contact with the jig, and other means on said frame for opening said pockets when said quill is in jig contact relationship.

16. A jig loading mechanism including a frame, a pair of slides mounted on said frame and movable along non-intersecting paths in intersecting planes towards the line of intersection thereof, a pair of oppositely disposed pivoted members mounted at one end of each of said slides and providing between each pair of members a split pocket, one of said split pockets being adapted to support one member of an assembly and the other of said split pockets being adapted to support another member of said assembly, said pairs of members being movable from a pocket loading position to a jig loading position, the line of intersection extending through said pockets when the pockets are in said jig loading position, a quill supported on said frame and in registry with the pockets when in jig loading position, and means for moving said quill through said pockets to engage the members of the assembly and into contact with the jig, and other means on said frame for opening said pockets when said quill is in jig contacting relationship, a stripper associated with said quill, and means for operating said stripper when said pocket members are in open position to cause the members of the assembly to be deposited in said jig.

References Cited in the file of this patent

UNITED STATES PATENTS

| | | |
|---|---|---|
| 2,878,556 | Heidergott et al. | Mar. 24, 1959 |
| 2,906,011 | Focht | Sept. 29, 1959 |